April 14, 1959 L. J. LYONS 2,882,036
CONVEYOR WEIGHING SCALE
Filed Sept. 13, 1955 3 Sheets-Sheet 1

INVENTOR
Lawrence J. Lyons
BY Paul L. Keehn
ATTORNEY

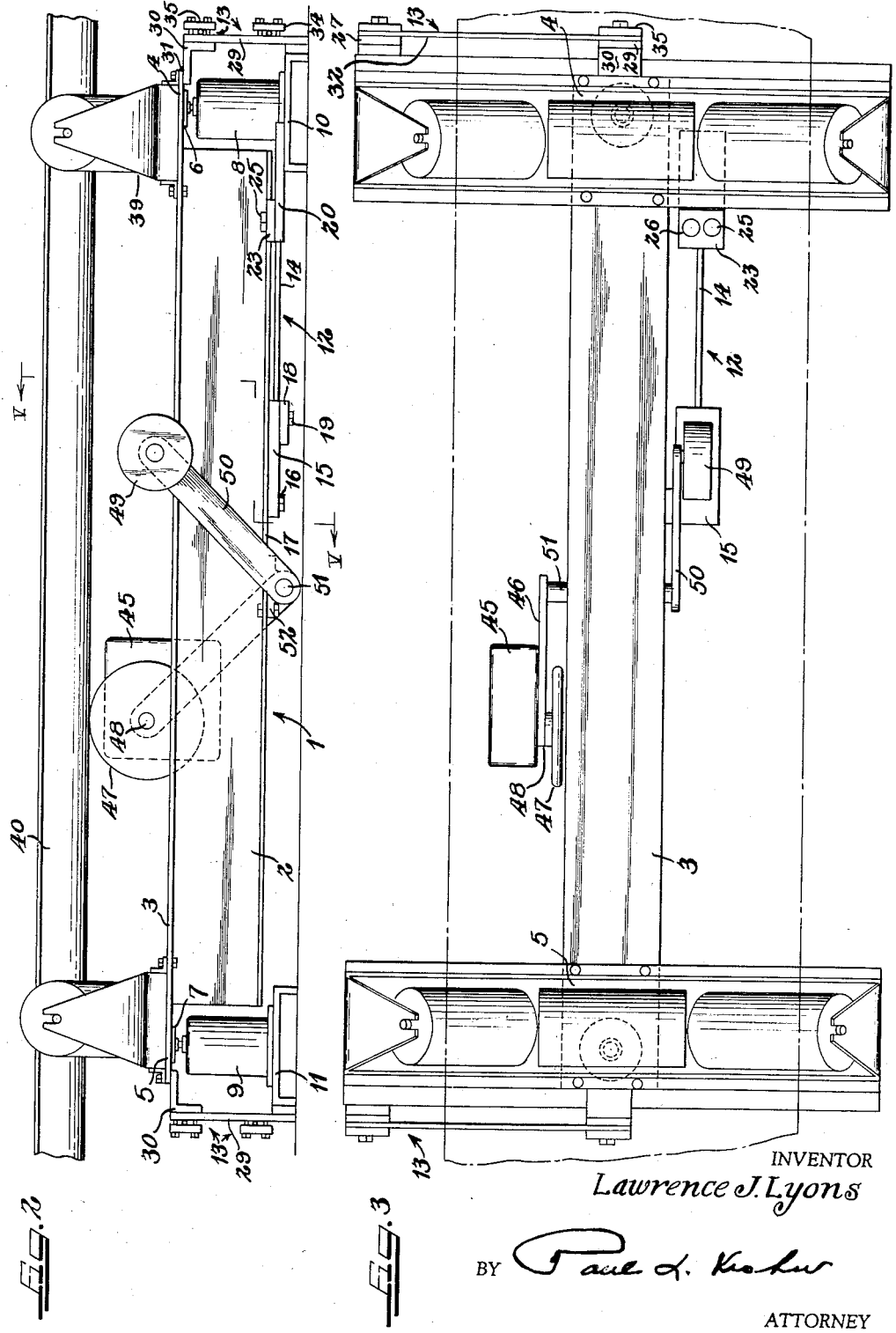

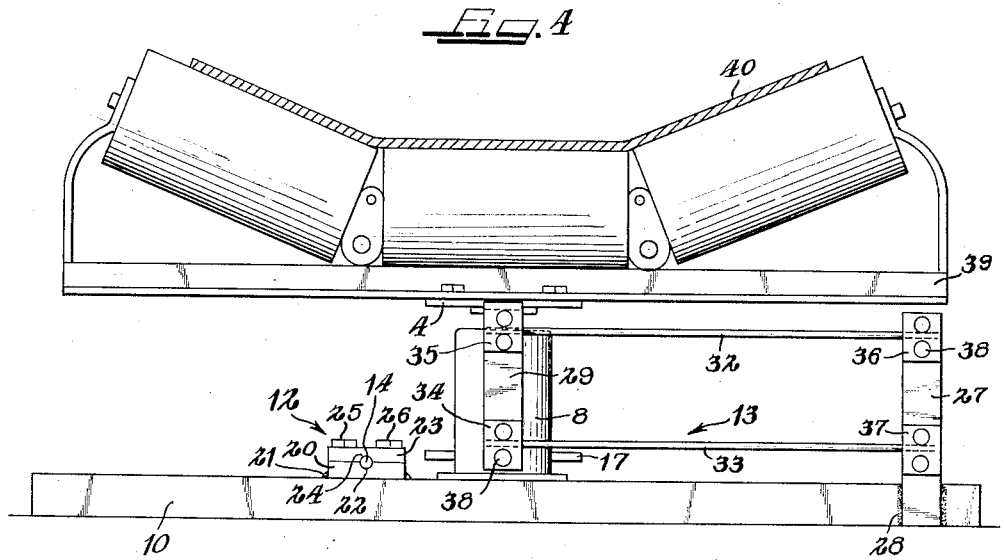
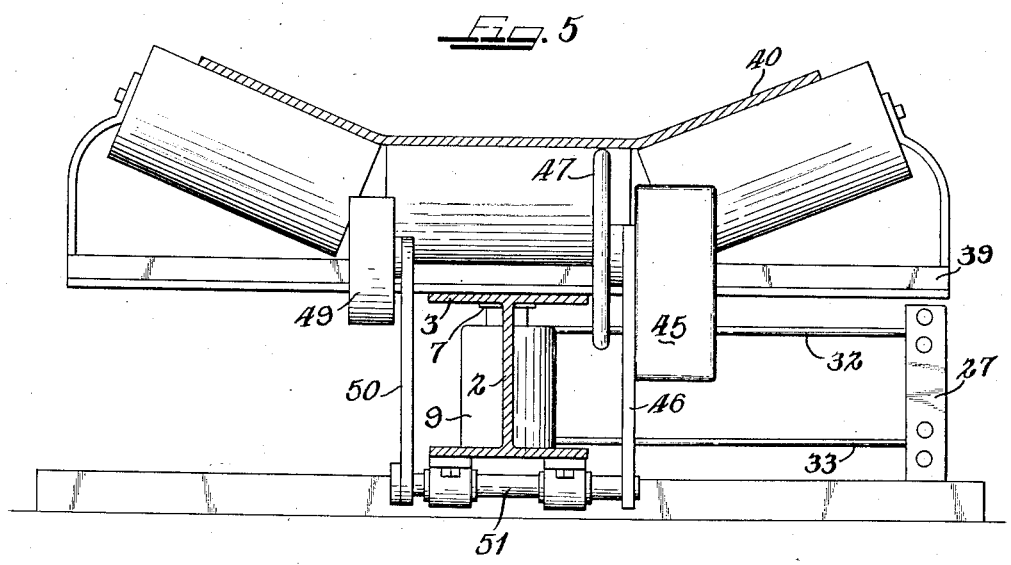

United States Patent Office 2,882,036
Patented Apr. 14, 1959

2,882,036

CONVEYOR WEIGHING SCALE

Lawrence J. Lyons, Davenport, Iowa, assignor to Fairbanks, Morse & Co., Chicago, Ill., a corporation of Illinois Application September 13, 1955, Serial No. 534,079

3 Claims. (Cl. 265—28)

This invention relates generally to conveyor weighing scales and more particularly to improvements in the mechanical structure thereof.

The primary object of this invention is to provide a conveyor weighing scale in which all of the scale structure is positioned below the conveyor belt.

A more specific object of this invention is to provide a conveyor weighing scale in which the number of structural parts is reduced to a minimum relative to similar scales in the prior art.

A further object of this invention is to provide a conveyor weighing scale with novel longitudinal and transverse check structures to stabilize the scale.

With the foregoing and other objects in view, the invention resides in the following specification and appended claims, certain embodiments and details of construction of which are illustrated in the accompanying drawings, in which:

Figure 2 is a view in rear elevation of the conveyor weighing scale without the indicators and the electrical leads connecting the scale thereto;

Figure 3 is a top plan view of the weighing scale of Figure 2;

Figure 4 is a view in end elevation of the conveyor weighing scale; and

Figure 5 is a partially sectional view taken along the lines 5—5 of Figure 2, but showing the counter-weight in full.

Figure 1:
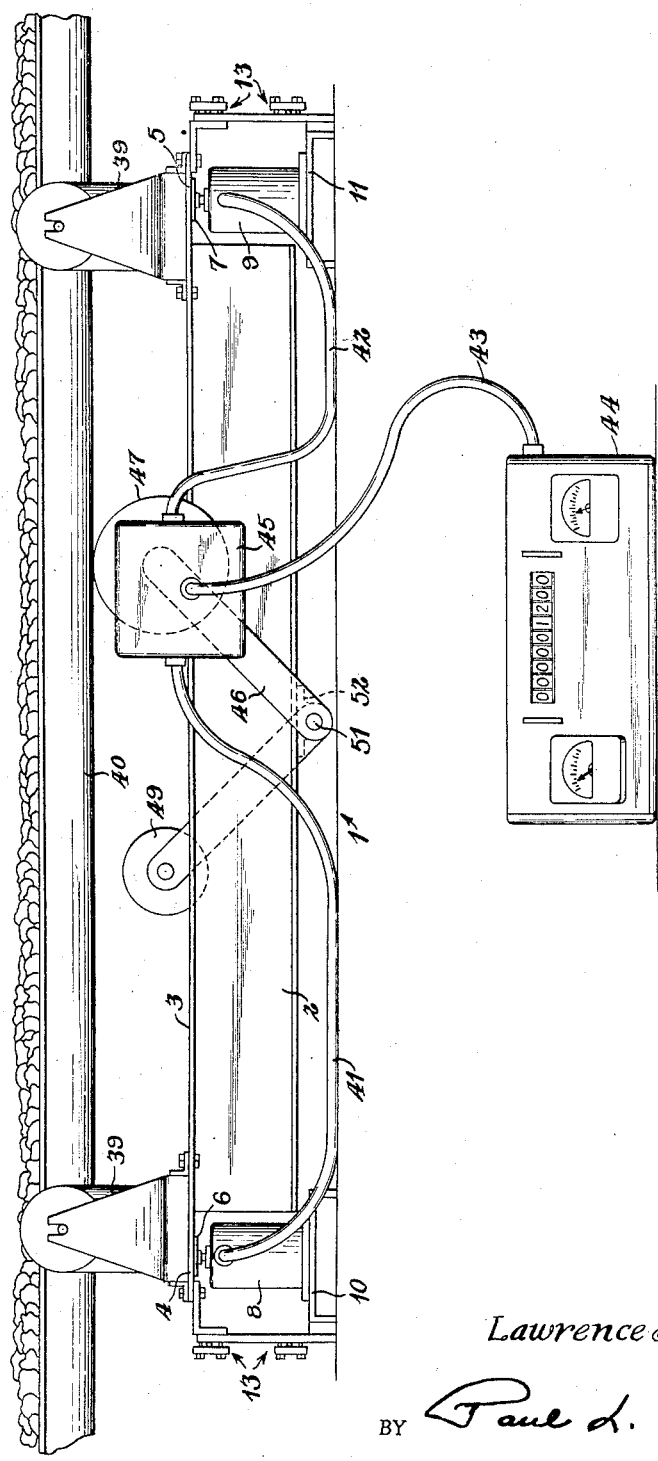
Figure 1 is a view in front elevation of the conveyor weighing scale and the indicators connected thereto.

Referring more particularly to the drawings, and particularly Figure 1, the conveyor weighing scale, generally indicated at 1, includes an I-beam 2. Beam 2 has an upper flange 3 which has longitudinal extensions 4 and 5 at either end of the beam. In lieu of such integral extensions, extra plates may be welded to each end of the beam. The extensions 4 and 5 of beam 2 engage the contact plates 6 and 7 respectively of load cells 8 and 9 so that beam 2 is freely supported at either end on the cells. The load cells 8 and 9 are supported on transverse channel beams 10 and 11, which in turn may be secured to the other general supporting structure, not shown. The load cells 8 and 9 are preferably of the resistance strain gauge type.

In order to longitudinally and rotatably stabilize the beam 2 in its supported position on the load cells 8 and 9, longitudinal and transverse check structures 12 and 13, respectively, (shown in Figure 2) are utilized. The longitudinal check consists of a metal rod 14 secured between the floating beam 2 and the fixed channel beam 10. The connection of rod 14 to beam 2 includes a metal plate 15 secured by a bolt 16 or other means to the bottom flange 17 of beam 2. A second plate 18 is bolted to plate 15 and clamps the rod securely when bolt 19 is tightened. Each plate 15 and 18 may be suitably recessed (not shown), with V-notches or the like, so that the rod 14 may be partially received by each plate.

The connection of rod 14 to channel 10 which is more clearly illustrated in Figure 4 includes a base plate 20 welded at 21 to channel 10. Plate 20 is recessed at 22 to partially receive rod 14. A top clamping plate 23, partially recessed at 24, mates with plate 20, and by tightening bolts 25 and 26 the rod 14 may be rigidly clamped therebetween.

With the check rod 14 securely clamped at each end, the beam is restrained from such longitudinal movements as would give rise to errors in weight detection by the load cells.

The transverse checks 13 are utilized to prevent tilting or rocking of the beam 2, thereby keeping all applied forces on the load cells 8 and 9 in the vertical plane to prevent errors in detection by the cells and to stabilize the scale generally. Since checks 13 are duplicated at each end of beam 2, only one need be described.

As may be seen in Figure 4, the check structure 13 includes an upright plate 27 secured by welding at 28 to channel 10. A second plate 29 is secured by welding, or other means, to an angle member 30 which itself is welded at 31 to the underside of extension 4 of beam 2. Thus plate 27 is secured to the stationary channel 10 while plate 29 is effectively secured to floating I-beam 2. Extending between plates 27 and 29 are parallel check rods 32 and 33. These rods 32 and 33 are clamped to the upper and lower portions of plates 27 and 29 by similar clamping plates 34, 35, 36, and 37, with their securing bolts 38. The plates 27 and 29, and plates 34, 35, 36, and 37 may be partially recessed to better accommodate rods 32 and 33 in mating clamped relationship. This transverse check structure 13, as described, is therefore in the form of a parallelogram with one side (the plate 27) fixed to the channel 10, and a parallel side (the plate 29) fixed to the beam 2. With the rods 32 and 33, forming the other sides of the parallelogram, securely clamped to the plates 27 and 29, the only plane in which the beam may move is the vertical plane, and hence the scale is stabilized against laterally tilting.

Secured to each of the extensions 4 and 5 of beam 2 is a conveyor roller bracket assembly 39 of conventional design to support the travelling conveyor belt 40, which carries the material to be weighed. By having no weigh structure above belt 40, there is nothing to obstruct the free carriage of items by the belt regardless of size or shape.

In operation, material which is carried by moving belt 40 passes over the scale and the weight thereof causes a downward deflection of the beam 2, which deflection is converted by the load cells 8 and 9 into proportional electrical signals. The cells, which are series connected strain gauges, are electrically connected through conductor cables 41 and 42 and common cable 43 to the read out indicator 44 which includes portions of the electrical system, which is the subject of my copending application for patent having Serial No. 533,979, filed September 13, 1955.

The conductor cables 41, 42, and cable 43, are junctioned at a receptacle 45. This receptacle is secured by suitable means, such as welding, to a lever arm 46. This receptacle 45 encloses a synchro and a generator, which are fully described in the aforementioned application.

For purposes of driving the synchro and the generator, a wheel 47 is suitably journaled at 48 to arm 46. The wheel 47 engages the under surface of the moving belt 40 and is rotated thereby to drive the generator and synchro to pass rate of travel information electrically through cable 43 to indicator 44.

In order to bias wheel 47 to engagement with the belt 40, a counterweight 49, for the wheel 47 and receptacle 45, is provided. This weight is carried by arm 50. The arms 46 and 50 are rigidly connected together through an axle member 51. Axle member 51 is freely journaled in bearing brackets 52 which are secured to the bottom flange 17 of beam 2. The counterweight 49 is just enough heavier than the wheel 47 and the receptacle 45 with its contents to make the wheel 47 engage the belt 40 with a biasing force on the order of approximately two pounds.

It is thus apparent that this invention provides in its general overall structure and in its check structure specifically, a conveyor weighing scale of the utmost simplicity where weight and belt speed values may be readily derived accurately for transmission to electrical indicating means.

While only one embodiment of the present invention has been described and illustraed, other modifications, rearrangements and changes will become apparent to those skilled in the art, and it is intended to cover all such rearrangements and modifications in the appended claims:

I claim:

1. A conveyor weighing scale with a load carrying belt carried by roller bracket assemblies comprising a unitary beam for supporting the roller bracket assemblies, said beam having upper flanges forming longitudinal extensions at either end thereof, and weight sensing means engaging said longitudinal extensions supporting each end of said beam.

2. A conveyor weighing scale with a load carrying belt carried by roller bracket assemblies and with an indicator comprising beam means for supporting the roller bracket assemblies, said beam having upper flanges forming longitudinal extensions at either end thereof load cell means engaging said longitudinal extensions and supporting said beam means to sense weights on the belt and to energize said indicator in accordance with the sensed weights, and means carried by said beam means for engaging the belt to detect the rate of travel of the belt over said roller bracket assemblies of the scale and for energizing said indicator in accordance with the rate of travel of said belt, whereby said indicator produces a reading which is a composite of both said energizing actions.

3. A conveyor weighing scale with a load carrying belt carried by roller bracket assemblies and with an indicator comprising a unitary beam for supporting the roller bracket assemblies, said beam having upper flanges forming longitudinal extensions at either end thereof a pair of load cells engaging said longitudinal extensions and supporting each end of the beam to sense weights on the belt and to energize said indicator in accordance with the sensed weights, and means movably carried by the beam and biased into engagement with the belt to detect the rate of travel of the belt over said roller bracket assemblies of the scale and for energizing said indicator in accordance with the rate of travel of said belt, whereby said indicator produces a reading which is a composite of both said energizing actions.

References Cited in the file of this patent

UNITED STATES PATENTS

| | | |
|---|---|---|
| 169,630 | Fairbanks | Nov. 9, 1875 |
| 1,174,337 | Messiter | Mar. 7, 1916 |
| 1,352,441 | Epright | Sept. 14, 1920 |
| 1,494,164 | Goldbeck | May 13, 1924 |
| 1,619,123 | Hem | Mar. 1, 1927 |
| 1,639,121 | Weber | Aug. 16, 1927 |
| 1,968,988 | Bousfield | Aug. 7, 1934 |
| 2,102,317 | Gwinn | Dec. 14, 1937 |
| 2,241,348 | Hem | May 6, 1941 |
| 2,636,724 | Eacrett | Apr. 28, 1953 |
| 2,661,091 | Maloney | Dec. 1, 1953 |
| 2,664,286 | Frazel | Dec. 29, 1953 |
| 2,671,657 | Cooper | Mar. 9, 1954 |
| 2,673,082 | Thurston | Mar. 23, 1954 |
| 2,716,547 | Thurston | Aug. 30, 1955 |
| 2,746,739 | Philippovic | May 22, 1956 |
| 2,764,316 | Sylvest | Sept. 25, 1956 |
| 2,779,583 | Bone | Jan. 29, 1957 |

FOREIGN PATENTS

| | | |
|---|---|---|
| 674,223 | Germany | Apr. 12, 1939 |
| 880,182 | France | Mar. 16, 1943 |